United States Patent

[11] 3,595,355

| [72] | Inventors | Paul Maucher<br>Neuweier;<br>Klaus Steeg, Eisental, both of, Germany |
|---|---|---|
| [21] | Appl. No. | 838,610 |
| [22] | Filed | July 2, 1969 |
| [45] | Patented | July 27, 1971 |
| [73] | Assignee | Luk Lamellen-und Kupplungsbau GmbH<br>Buhl (Baden), Germany |
| [32] | Priority | July 6, 1969 |
| [33] | | Germany |
| [31] | | P 17 75 115.4 |

[54] SEATING ASSEMBLY FOR PLATE SPRINGS, ESPECIALLY IN CLUTCHES
16 Claims, 9 Drawing Figs.

[52] U.S. Cl. .................................................. 192/70.27, 192/89 B
[51] Int. Cl. .................................................. F16d 13/71
[50] Field of Search .......................................... 192/70.27, 89 B

[56] References Cited
UNITED STATES PATENTS
1,919,523  7/1933  Meyer .................... 192/70.27 (X)

| 2,359,104 | 9/1944 | Geyer | 192/70.27 |
| 2,359,184 | 9/1944 | Wolfram | 192/70.27 |
| 3,499,512 | 3/1970 | Maurice | 192/89 (B) |

FOREIGN PATENTS

| 19,958 | 4/1956 | Germany | 192/89 (B) |
| 961,405 | 6/1964 | Great Britain | 192/89 (B) |

*Primary Examiner*—Allan D. Herrmann
*Attorneys*—Curt M. Avery, Arthur E. Wilfond, Herbert L. Lerner and Daniel J. Tick ABSTRACT: Seating assembly for plate spring includes a pair of annular rolloff seats disposed in substantially parallel planes respectively on opposite sides of a plate spring, at least one of the seats being in the form of a wire ring, a cover member overlying one of the annular seats, fastening pins connecting the cover member and the plate spring sandwiched between the annular seats into a unitary structure, the wire ring having ends spaced from and facing one another, and bearing means having a contour surface corresponding at least partly to the contour surface of the wire ring and being received at least partly in the bearing means.

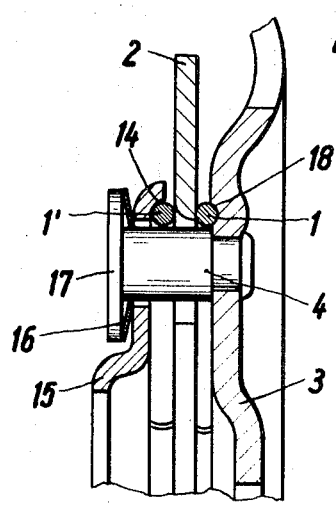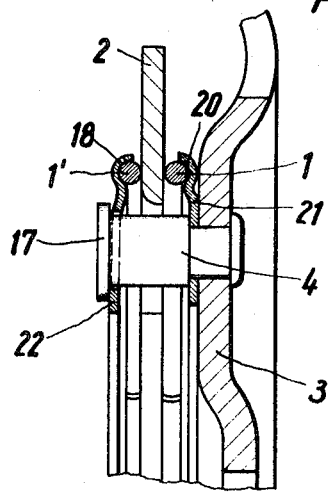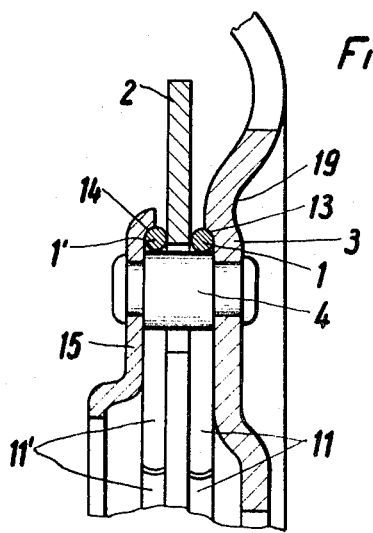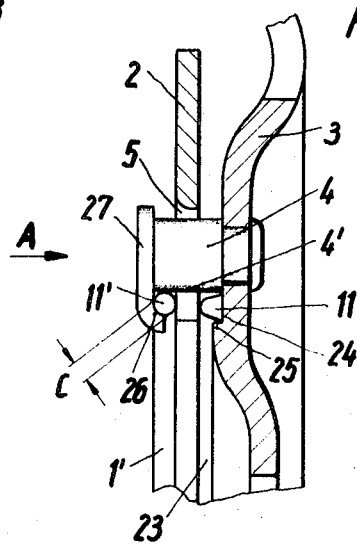

SEATING ASSEMBLY FOR PLATE SPRINGS, ESPECIALLY IN CLUTCHES

Our invention relates to seating assembly for plate springs, especially in clutches, and to the fastening means therefor, wherein the assembly includes a pair of rolloff seats sandwiching a plate spring therebetween, at least one of the seats being in the form of a wire ring, the plate spring being connected into a unitary structure with a cover member by fastening pins. This general construction is disclosed in the copending application Ser. No. 838,611, filed concurrently with this application of which the first-mentioned coinventor in the instant application is the sole inventor.

In known friction clutches, for which the assembly of our invention has its primary application, the ends of the rolloff rings or seats formed of wire are butt-welded to one another so that the rolloff or support ring has a relatively high inherent or natural stability and cannot become deformed or especially expanded during the rolling-off movement between the plate spring and the seats. Since weldable materials are the only ones which can be used for the rolloff rings, the choice of materials for these rings is therefore very limited in the heretofore known clutches. These materials have the disadvantage, however, that they exhibit a very low resistance to wear and fracture. To avoid this deficiency of the heretofore known seating assemblies, it has been proposed in the French patent 1,402,399 to form the rolloff rings no longer of closed rings but rather to employ nonwelded, open wire rings as rolloff rings, the open ends of which are provided with a substantially right-angle bend and are inserted in an opening formed in the plate spring. Such a construction has the disadvantage, however, that the rolloff ring does not engage the plate spring over a relatively great length thereof so that undesired stress conditions are produced and, moreover, the open ends of the rolloff rings are not clamped over a relatively large area of the surface thereof so that movements of the rolloff ring in radial direction can occur in the vicinity of the open ends thereof during the swinging motion of the plate spring. This latter disadvantage produces a further increased wear and moreover changes or displaces the swinging or pivot point of the plate spring.

To eliminate the last-mentioned disadvantages, it has been proposed in the German petty patent 1,983,849 to employ a plate spring clutch wherein the open wire rings are bent at right angles at the ends thereof, and these bent ends respectively engage, on the one hand, a bore of a rivet and, on the other hand, a bore of the cover for the clutch. The manufacture of such a clutch is, however, extremely complex because the rivets or pins and the bores therefor must be accurately aligned with the bent ends of the rolloff rings before the riveting process is undertaken and must be held in the correct position during the welding operation, in order to be able to secure the bent ends of the rings in the predetermined positions.

The heretofore known clutches with open wire rings have the further disadvantage that the ends of the wire rings must be sharply bent in order to secure them firmly. The manufacture of these rings, therefore, requires an additional operation which moreover adds considerably to the cost of manufacture. For example, no materials have become known heretofore which can be bent into the sharp angle required for the heretofore known seating assemblies for clutches, which materials have the required high resistance that will minimize the occurrence of fissures at the bending location. Such fissures are accompanied by an extremely high danger of rupture or fracture of the rolloff rings. In order to avoid the formation of fissures, it would be necessary to bend the ends of the rings while they are heated to annealing temperature. These rings would therefore lose their required hardness in the location of the bends so that there is again produced an increased wear during operation of the clutch at these locations.

It is accordingly an object of our invention to provide seating assembly for plate springs, especially in clutches, which avoids the aforementioned disadvantages of the heretofore known assemblies of this general type.

In accordance with other objects of our invention, we provide a seating assembly with rolloff rings which need not be welded at the ends thereof so that no concern need be had as to the weldability of the materials forming the seats, and materials can be employed which afford an optimum wear and fracture resistance.

Additional objects of our invention are to provide such seating assembly for plate springs which will permit of the simplest possible assembly thereof in a clutch and which will afford a nondisplaceable holder for the rings.

It is an added feature of our invention to provide such seating assembly for plate springs wherein the manufacture of the open rings is simplified and can be carried out relatively economically due to the fact that various operations can be dispensed with and the possible damage that could occur to the ring ends during those operations can be avoided.

With the foregoing and other objects in view, we provide in accordance with our invention seating assembly for plate spring comprising a pair of annular rolloff seats disposed in substantially parallel planes respectively on opposite sides of a plate spring, at least one of the seats being in the form of a wire ring, a cover member overlying one of the annular seats, fastening pins connecting the cover member and the plate spring sandwiched between the annular seats into a unitary structure, the wire ring having ends spaced from and facing one another, and bearing means having a contour surface corresponding at least partly to the contour surface of the wire ring and being received at least partly in the bearing means.

By employing wire rings with ends that are spaced from and face one another, the additional annealing and bending operations required for the heretofore known open wire rings are dispensed with, so that with an assembly according to our invention the high quality properties of the material can be fully utilized and can be maintained over the entire area of the rings. By inserting the wire rings at least in partial areas of the peripheral surface thereof in bearing means having a contour surface corresponding at least partly to the contour surface of the wire ring, a completely closed annular shape of the rolloff rings can be obtained so that an unbroken seating of the plate spring on the rolloff rings is assured.

In accordance with a further feature of the invention, we provide that the mutually facing ends of the ring are embedded with their entire peripheral surface in the bearing means having a contour surface corresponding to the contour surface of the ring. It is also in accordance with a feature of our invention, however, to embed only the end regions of the ring and not the total peripheral surface thereof in the bearing means. Further holding devices for the rings can also be provided in accordance with our invention in the form of pins distributed over the periphery of the ring.

In accordance with another feature of the invention, the bearing means can be formed of a closed annular bead or of an annular bead formed with discontinuities, which has a contour surface corresponding at least partly to the contour surface of the wire ring and which is disposed on the side of the ring facing away from the pins.

In accordance with yet a further feature of the invention, the bearings are in the form of a groove wherein the wire ring is embedded over the entire surface thereof and which has a contour surface corresponding to the contour surface of the ring.

In accordance with other features of the invention, the annular bead or groove or the like comprised by the bearing means for the ring facing the cover member, can be secured to the cover member by being, for example, welded thereto, or can be worked into the cover, for example by being cut or pressed therein or the like.

In accordance with an additional feature of the invention, especially for the ring seat facing away from the cover member, we provide the bearing means on a plate-shaped member disposed coaxially to the plate spring, the ring being embedded over the entire annular periphery thereof or only over part of the periphery thereof, in the bearing means which has a contour surface at least partly corresponding to the contour surface of the ring.

In accordance with a further feature of the invention and to provide a secure support of the ring, the ring which is engaged by the bearing means directly abuts the holder pin thereby affording an additional fixed support of the ring against movement in the radial direction.

According to another feature of the invention, the bearing means comprise collars formed on the pins and provided with grooves having contour surfaces corresponding at least partly to the contour surfaces of the wire ring. End areas of the open ring are partly encircled by the collars of the pins forming the bearing means or are embedded in the grooves provided in the collars. The means for supporting or fixing the other peripheral areas of the ring is effected by the aforementioned pins especially when the ring is disposed radially inwardly of the pins.

In order to prevent the open ends of the ring from slipping out of the grooves formed in the collars of the pins due to travel of the ring ends in peripheral direction during operation of the clutch, and in order to ensure that the open ring ends are received in correct position within the respective grooves formed in the collars and are retained therein during the riveting operation, we provide in accordance with our invention in a groove formed in a collar of at least one of the pins, a dividing crosspiece disposed substantially in the middle of the longitudinal dimension thereof.

In accordance with another feature of the invention, the pin, at the side thereof facing the ring, is provided with a contour surface corresponding at least approximately to the contour surface of the ring so that the ends of the ring can abut a relatively wide surface of the pin and, together with the grooves, are immovably secured.

When rolloff rings with open ends are employed at rolloff seats on both sides of the plate spring within the clutch, we provide in accordance with our invention that the dividing crosspiece extends substantially over the entire length of the pin collar. For more readily inserting the crosspiece into the space between the ends of the ring, we provide according to a further feature of the invention a crosspiece which has a knife edge construction and the ring ends additionally have an inclination corresponding to the angle of the knife edge.

In accordance with a further feature of the invention, the part of the dividing crosspiece directed toward the plate spring abuts the plate spring in the riveted condition of the pin, forming a seating surface therebetween corresponding to the extension of the rolloff surface of the ring. Thus, the small space remaining between both ring ends is filled out by a seating surface.

In accordance with yet a further feature of the invention, the pin, at a portion thereof provided for the support in the cover member, has a cross section which deviates from the circular cross section and which corresponds substantially to the cross section of the opening in the cover member for receiving the pin therein, so that the pin is insertable only in a predetermined position therein and can accordingly be riveted.

In accordance with an added feature of the invention, which facilitates the insertion of the pin into the pin-receiving opening formed in the cover member, we provide the pin with a shaft having a substantially conical end portion for forming a rivet head therein.

In accordance with further features of our invention, the bearing means is suitably spring loaded for biasing the wire ring associated therewith in a direction toward the plate spring. Various means can be provided for effecting this spring biasing action. These are, for example, disclosed in the aforementioned copending application, by disposing the platelike member provided with the bearing means coaxially to the plate spring, centering the same by means of pins, for example, and providing respectively around these pins plate springs which engage a collar of the pins, on the one hand, and the platelike member, on the other hand. Another means for spring biasing the bearing means is to dispose the bearing means proper adjacent to a springy member, for example a plate spring disposed coaxially to the clutch plate spring.

Other features which are considered as characteristic for the invention are set forth in the appended claims.

Although the invention is illustrated and described herein as embodied in seating assembly for plate springs, especially in clutches, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 2 through 5 are partial cross-sectional views of modified forms of the seating assembly for plate springs shown in FIG. 1;

Figure 1:
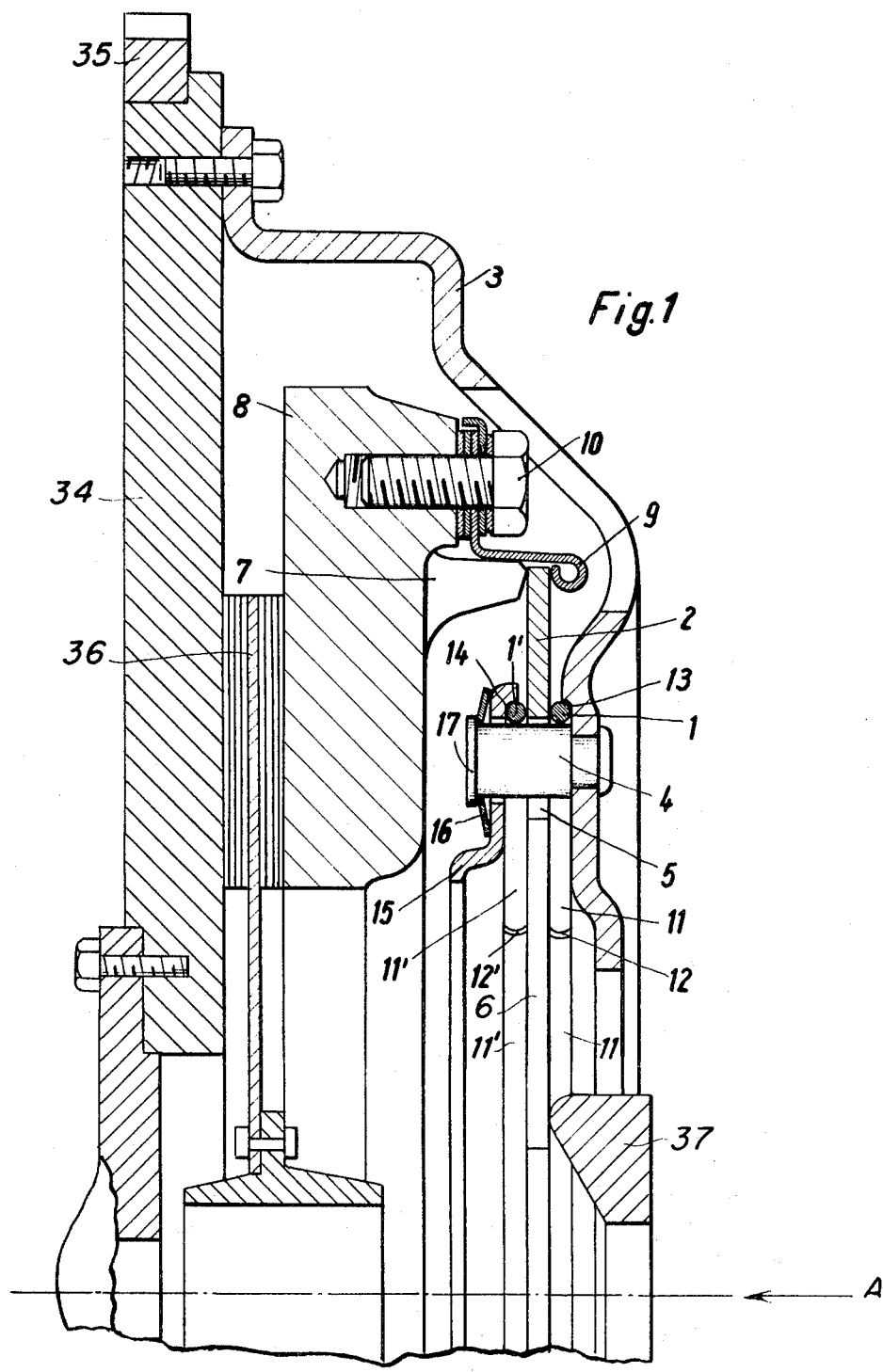
FIG. 1 is a half cross-sectional view of a friction clutch including an embodiment of the seating assembly for plate springs according to our invention.

Referring now to the drawings, and first particularly to FIG. 1 thereof, there is shown in cross section a friction clutch wherein rolloff seats in the form of wire rings 1 and 1' located in substantially parallel planes, a plate spring 2 disposed between the wire rings 1 and 1' and a cover member 3 are all assembled into a unitary structure by holder pins or bolts 4. Openings 5 are formed in a conventional manner in the plate spring 2, and the holder pins 4 riveted in the cover member 3 project respectively through the openings 5. From each opening 5, a tongue 6 extends respectively toward the center of the plate spring 2. For further details of this construction, reference can be had to the aforementioned copending application.

The plate spring 2, at the outer peripheral area thereof, engages cams 7 of a pressure plate 8. A spring 9, which is connected by a screw 10 with the pressure plate 8, presses the cams 7 against the outer peripheral surface of the plate spring 2.

The friction clutch according to our invention is furthermore provided with a conventional flywheel 34 in the form of a counter-pressing disc which carries a ring gear 35 at the rim thereof. The cover 3 is secured by screws to the flywheel 34, and the pressure plate 8 is indirectly connected through spring 9, plate spring 2 and pins or rivets 4 to the cover 3. The pressure plate 8 is axially displaceable by the plate spring 2 toward the counterpressure disc 34 and an entrainer disc 36 rotatably secured on a nonillustrated shaft. In the position shown in FIG. 1, the clutch is in an engaged condition. To disengage the clutch, the disengaging or shift ring 37, which engages the points of the tongues of the plate spring 2, is displaced in the direction of the arrow A by a nonillustrated shift mechanism so that the outer region of the plate spring 2 clamped between the seats 1 and 1' tends to swing toward the cover 3.

According to our invention, the rolloff seats 1 and 1' employed in the embodiment of FIG. 1, are in the form of wire rings with ends 11 and 11' that are unconnected and face one another, separated by a relatively narrow space 12 and 12'. The wire rings 11 and 11' are embedded over at least part of the peripheral surface thereof in bearing devices 13 and 14 that have a contour surface corresponding at least partly to the contour surface of the rings 1 and 1' and, in fact, in such a way that the swinging or pivoting movement of the plate spring 2 is not impeded by these bearing devices 13 and 14.

The bearing device 13 for the ring 1 facing the cover member 3 is formed of an annular bead provided in the cover member 3, which grips this ring 1 at least in partial areas of the peripheral surface thereof. The bearing device 13 is preferably constructed in such a way that the ends or end portions 11 of the ring 1 are embedded in the bearing device 13 so as to prevent travel in radial direction of the ring end portion 11 during swinging or pivoting motion of the plate spring 2.

The bearing device 14 for the ring 1' located at the side of the plate spring 2 facing away from the cover member 3 is of beadlike construction and is provided on a platelike member 15 disposed coaxially to the plate spring 2. This platelike member 15 is retained by pins 4 riveted to the cover member 3, compression springs in the form of plate springs 16 being disposed about the pins 4 and resiliently supported or braced, on the one hand, against a collar 17 formed on the pin 4 and, on the other hand, against the platelike member 15. By means of the prestressed riveted plate springs 16, a spring-loaded support of the wire ring 1' in direction toward the plate spring 2 is assured, so that a play-free mounting of the plate spring 2 between both rolloff rings 1 and 1' is afforded even when wear or abrasion is manifested.

As a matter of expedience, the plate springs 16 are of such construction as to exert a force on the platelike member 15 that is at least equal to or greater than the disengaging force of the plate spring 2 that is exerted on the rolloff or slide ring 1' when the clutch is disengaged.

The bearing devices 13 and 14 in the form of annular beads grip or surround the rings 1 and 1', respectively, over the entire peripheral area of the latter. In many cases, however, it may be sufficient for one or both bearing devices 13 and 14 to surround or grip the respective wire rings 1 and 1' only at partial areas of the peripheral surface thereof. An accordingly constructed bearing device can be formed of individual, more-or-less long sections, having a contour surface corresponding in part to the peripheral contour surface of the respective ring seat and/or to the circular cross section of the ring.

In FIG. 2 there is shown in partial cross section a further embodiment of the invention corresponding substantially to the embodiment of FIG. 1 but wherein, however, the rolloff ring 1 facing the cover member 3 is embedded in a bearing device in the form of a groove 18 provided in the cover member 3 and having a contour surface partly corresponding to the contour surface of the ring 1. The production of this bearing device 18 in the form of a groove is especially simple, in that it is embossed or impressed in the cover member 3 as the latter is being manufactured. As illustrated in FIG. 2, the spring-loaded support or bracing of one of the rolloff rings i.e. the rolloff ring 1' in the instant case, in direction toward the plate spring 2 is effected by means of plate springs 16, the outer diameter edge thereof abutting the collar 17 of the pins 4 and the inner diameter edge thereof abutting the platelike member 15.

According to the embodiment of FIG. 3, the bearing device 13 provided in the cover member 3 for the unconnected ends 11 of a ring 1 facing one another, is made up of a bead 9 impressed in the cover member 3. The ring 1' disposed on the other side of the plate spring 2 and having unconnected ends 11' facing one another, is embedded in a bearing device 14 having a contour surface at least partly corresponding to the contour surface of the ring 1' at least in partial areas of the peripheral surface, and preferably, however, over the entire peripheral surface of the ring 1'. This bearing device 14 is located at a plate-shaped member 15 which is maintained coaxially to the plate spring 2 by a plurality of pins 4 distributed over the periphery of the cover member 3, yet not resiliently supported or braced in this embodiment of FIG. 3.

In the embodiment of FIG. 4, one of the bearing devices, namely the bearing device 20 for the ring 1 facing the cover member 3, is provided on a platelike member 21 which is riveted by the pin 4 to the cover member 3.

The bearing device 20 can also be formed of a plurality of partial members each having a contour surface corresponding in part to the contour surface of the ring 1.

The bearing device provided for the ring 1' facing the cover member 3, in the embodiment of FIG. 4, is again formed of a grooved portion 18 of a platelike member 22 disposed coaxially to the plate spring 2. This platelike member 22, which is fastened by rivets 4 distributed circumferentially about the cover member 3, can be made of springy material and be riveted in prestressed condition so that the ring 1' is provided with spring-loaded support or bracing toward the plate spring 2.

According to the embodiment of FIG. 5, one of the rolloff seats 23 is formed of a circularly bent profile wire 23 having unconnected ends 11. This ring 23 has a flat bearing surface 24 facing away from the bearing side of the plate spring 2 and abutting the cover member 3. The bearing device for the ring 23 is made up of an annular bulge or bead 25, which is formed on the cover member 3, and grips the ring 23 at least at partial areas of the peripheral surface thereof and has a contour surface corresponding partly to the contour surface of the ring 23.

The opposite ring 1' of the embodiment of FIG. 5 is embedded in a bearing device formed of a grooved portion 26 of a collar 27 carried by the pin 4. The ring 1' is embedded at least with part of the area of its peripheral surface in the groove 26, and the latter has a contour surface partly conforming to the contour surface of the ring 1'. It is especially advantageous for both open end regions of the ring 1' to be surrounded at areas thereof of uniform size and to be embedded in this groove 26.

To assure greater contact area of the rings 1' and 23 or the ring ends 11' and 11 at the pin 4, it is expedient to provide the surface 4' of the pin 4 facing the ring ends 11' and 24 with a contour surface that conforms substantially to the contour surface of the respective rings 1' and 23.

In the embodiment of FIG. 5, the rings 1' and 23 are located radially inward of the pins 4. Obviously, the rings 1' and 23 may be located radially outward of the pins 4 as in the embodiments of FIGS. 1 to 4.

Figure 6:
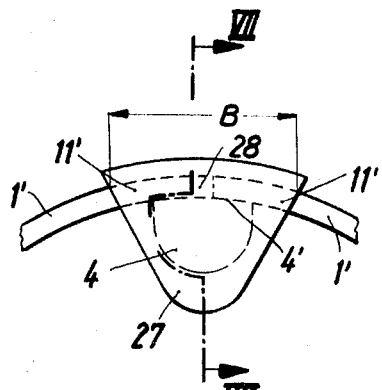
FIG. 6 is an end view of the modified form of rivet pin forming part of the seating assembly shown in the embodiment of FIG. 5.

An especially desirable modification of the collar 27 of the pin 4, as seen in the direction of the arrow A of FIG. 5, is shown in FIG. 6. The ring 1' or the ring ends 11' extend radially outward from the pin 4 and abut the surface 4' of the pin 4 which has a contour that at least partly conforms to the contour of the ring 1'.

The collar 27 of the pin 4, as shown in FIGS. 5 and 6, has a cross-sectional shape which deviates from the circular shape of the pins heretofore employed in the various embodiments and in fact, in the embodiment of FIG. 6, is of triangular shape. This shape of the collar 27 which deviates from the circular shape assures a correct positioning of the pin 4 as it is inserted into the opening, for example in the cover member 3, wherein the pin is to be received, by means of automatic rivet guiding devices.

It is believed to be apparent from FIGS. 5 and 6 that the ends 11' of the ring 1' are embedded over an area portion B of the peripheral surface thereof, with unconnected and oppositely directed end faces thereof, in a groove portion 26 of the collar 27 which serves as a bearing device. The contour surface of the bearing device, i.e. of the groove 26, in the region B (FIG. 6) or C (FIG. 5) conforms to the contour surface of the ring 1'.

For correctly positioned support of the ring 1' or for fixing the ring ends 11' and, for that matter, also the ring ends 11 of the ring 23, a dividing crosspiece 28 is provided in the middle of the longitudinal dimension of the groove 26. The ring ends 11 or 11' abut the dividing crosspiece 28 so that they are immovably fixed in a predetermined position.

Figure 7:
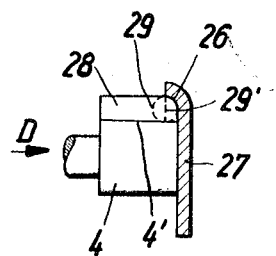
FIG. 7 is a sectional view of FIG. 6 taken along the line VII—VII in the direction of the arrows.

The structure of this dividing crosspiece 28 is especially apparent from FIG. 7 wherein it is shown to be connected to the collar 27 of the pin 4 and to extend over substantially a major part of the length of the pin 4.

Under specific conditions, for example when the rolloff seat facing the collar 27 of the pin 4 is formed of an open wire ring it can be advantageous for the crosspiece 28 to extend only to the region 29 or 29' indicated by a dotted line and thereby to form a contour surface which corresponds to the rolloff contour surface of the ring. Assurance is thereby obtained that the open space 12 or 12' (FIG. 1) between the ends of the respective rings is filled out by the dividing crosspiece 28 so that the open ring with mutually oppositely directed ends provided in accordance with our invention will form rolloff surfaces that will have no interruptions or breaks therein.

Figure 8:
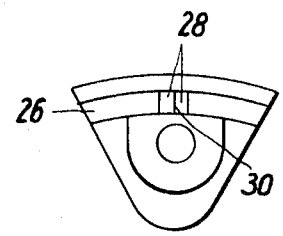
FIG. 8 is an end view of the rivet pin of FIG. 7 as shown in the direction of the arrow D.

FIG. 8, which shows a pin 4 in the direction of the arrow D as seen in FIG. 7, discloses a dividing crosspiece 28 which, in the region 29 thereof, has the form of a knife edge or wedge, the sharp edge 30 proper thereof extending in a direction toward the plate spring 2 as viewed in FIG. 5. The inclined surfaces of the dividing crosspiece 28 assure trouble free insertion thereof into the space between the ends of the ring 1' or 23. The ring ends can have cut surfaces conforming to the inclined surfaces of the dividing crosspiece 28 so that the insertion of the crosspiece 28 into the space between the ends of the ring is even further facilitated thereby and moreover ensures maintenance of the ring in its intended position.

Such dividing crosspiece having the contour surfaces 29 or 29' can obviously also be provided in all of the other embodiments of the bearing devices aforedescribed and illustrated in the instant application.

Figure 9:
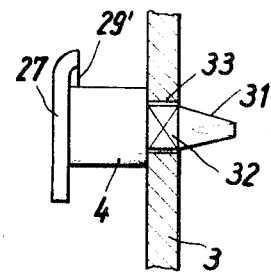
FIG. 9 is a longitudinal view of the rivet pin of FIGS. 5 through 8 just prior to the formation of a rivet head thereon.

In order to simplify even further the insertion of the pins into the opening for receiving the same such as, for example, is formed in the cover member of the clutch, or in order to avoid the necessity for exacting structural requirements to be imposed on the insertion device, which has been, for example, the case with the heretofore known devices, the end 31 of the pin 44 from which the rivet head of the pin 4 is formed, is substantially conically constructed as shown in FIG. 9. The holder portion 32 which is to be retained within the opening formed in the cover member 3 has a cross section which deviates from the circular cross section which has been employed in the heretofore used rivets. In the embodiment of FIG. 9, this holder portion 32 has a rectangular cross section which corresponds substantially to the cross section of the opening 33 which is formed in the cover member 3 for receiving the rivet pin therein. The necessity for holding the rivet rigid during the formation of the rivet head is therefore obviated since, presupposing a suitably accurate arrangement of the holder portion 32 and the rivet receiving opening 33, an accurate nondisplaceable and nonrotatable means for holding the rivet and thereby also an accurate means for holding the ends of the wire is assured. The holder portion 32 can also have a different cross section than a rectangular one, for example elliptic, triangular or the like.

From FIGS. 1 to 6 and 8 it is apparent that the ring surrounded by the bearing device directly abuts the shaft of the pin 4 thereby providing further assurance against travel of the ring in radial direction.

It is believed to be clear that a seating assembly for plate springs and the means for fastening the same according to the invention of the instant application has quite considerable advantages over the heretofore known devices of this general type. Thus, for example, the rolloff rings of the invention in this application no longer are required to be welded or the ends thereof need no longer be bent away by means of costly methods or devices, so that with devices according to the invention in the instant application, materials of high quality characteristics can be employed in rolloff rings, the characteristics thereof not being changed during the course of operation of the device. Moreover, the rolloff seats of the invention in the instant application are not interrupted at all or only quite negligibly so that no undesired stresses can arise at the plate springs. Furthermore, the assembly of the clutch employing the seating assembly for plate springs according to the invention in the instant application or the manufacture thereof is significantly simplified over clutches employing the previously known assemblies of this general type.

As aforementioned, our invention is not limited to the aforedescribed and illustrated embodiments. Other combinations of the modifications and embodiments disclosed herein are within the scope of the invention. For example, one of the rolloff rings can be replaced by a differently shaped rolloff seat, for example by a beadlike bulge.

We claim:

1. Seating assembly for plate spring comprising a pair of annular rolloff seats disposed in substantially parallel planes respectively on opposite sides of a plate spring, especially in a clutch at least one of said seats being in the form of an open wire ring, a cover member located adjacent one of said annular seats, fastening pins connecting said cover member and sandwiching the plate spring between said annular seats and forming therewith a unitary structure, said open wire ring having ends spaced from and facing one another, and bearing means having a contour surface corresponding at least partly to the contour surface of the wire ring, said wire ring being embedded at least at said spaced ends thereof in said bearing means.

2. Seating assembly according to claim 1 wherein said bearing means comprises a single device in which both said wire ring ends are embedded.

3. Seating assembly according to claim 1 wherein said bearing means comprises an annular bead located at a side of said wire ring facing away from said fastening pins.

4. Seating assembly according to claim 1 wherein said bearing means comprises a member formed with a groove wherein said wire ring is received.

5. Seating assembly according to claim 1 wherein said bearing means is located on said cover member.

6. Seating assembly according to claim 1 including a platelike member disposed coaxially to said plate spring, said bearing means being located on said platelike member.

7. Seating assembly according to claim 1 wherein the wire ring received in said bearing means is in direct abutting engagement with said fastening pins.

8. Seating assembly according to claim 1 wherein said fastening pins are formed with respective collars, said bearing means comprising part of said collars and formed with respective grooves therein, said grooves having a contour surface substantially conforming in part to the contour surface of said wire ring.

9. Seating assembly according to claim 1 wherein said fastening pins are formed with a substantially conical end, respectively, said conical end being flattenable into a rivet head.

10. Seating assembly according to claim 1 wherein said fastening pins are formed with respective collars, said collars having a shape differing from circular shape.

11. Seating assembly according to claim 1 wherein said fastening pins have a side thereof facing said wire ring, said side of said fastening pins having contour surface substantially conforming to the contour surface of said wire ring.

12. Seating assembly according to claim 1 wherein said bearing means includes means for spring biasing the wire ring receivable in said bearing means in direction toward said plate spring.

13. Seating assembly according to claim 1 wherein said fastening pins are formed with a shank portion receivable in an opening formed in said cover member, said opening having a cross section deviating from a circular cross section.

14. Seating assembly according to claim 13 wherein said shank portion of said rings has a cross section substantially similar to the cross section of said opening.

15. Seating assembly for plate spring, especially in a clutch, comprising a pair of annular rolloff seats disposed in substantially parallel planes respectively on opposite sides of a plate spring, at least one of said seats being in the form of a wire ring, a cover member located adjacent one of said annular seats, fastening pins connecting said cover member and sandwiching the plate spring between said annular seats and forming therewith a unitary structure, said wire ring having ends spaced from and facing one another, and bearing means having a contour surface corresponding at least partly to the contour surface of the wire ring, said wire ring being received at least partly in said bearing means, said fastening pins being formed with respective collars, said bearing means comprising part of said collars and formed with a respective groove therein, said groove having a contour surface substantially conforming in part to the contour surface of said wire ring, and a dividing crosspiece disposed in and interrupting the respective groove formed in said pin collars.

16. Seating assembly according to claim 15 wherein said dividing crosspiece extends along a major part of the length of said pin.